(12) United States Patent
Liu et al.

(10) Patent No.: US 12,225,510 B2
(45) Date of Patent: *Feb. 11, 2025

(54) RESOURCE POOL CONFIGURATION METHOD, RESOURCE POOL USING METHOD, CONFIGURATION DEVICE, AND TERMINAL

(71) Applicant: VIVO MOBILE COMMUNICATION CO., LTD., Guangdong (CN)

(72) Inventors: Siqi Liu, Chang'an Dongguan (CN); Zichao Ji, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/498,878

(22) Filed: Oct. 31, 2023

(65) Prior Publication Data

US 2024/0064710 A1  Feb. 22, 2024

Related U.S. Application Data

(63) Continuation of application No. 17/214,601, filed on Mar. 26, 2021, now Pat. No. 11,844,051, which is a (Continued)

(30) Foreign Application Priority Data

Sep. 26, 2018 (CN) .......................... 201811126468.X

(51) Int. Cl.
  *H04W 24/08* (2009.01)
  *H04L 27/26* (2006.01)
  (Continued)

(52) U.S. Cl.
  CPC ....... *H04W 72/044* (2013.01); *H04L 27/2605* (2013.01); *H04W 24/08* (2013.01); *H04W 56/001* (2013.01); *H04W 72/543* (2023.01)

(58) Field of Classification Search
  CPC .......... H04W 72/543; H04W 27/2605; H04W 24/08
  (Continued)

(56) References Cited

U.S. PATENT DOCUMENTS 11,601,955 B2   3/2023  Dinan
2017/0041902 A1   2/2017  Sheng
(Continued)

FOREIGN PATENT DOCUMENTS

CN   104936187 A   9/2015
CN   105813204 A   7/2016
(Continued)

OTHER PUBLICATIONS

Samsung., "Specification impact in case of TDD Pcell for TDD-FDD CA," 3GPP TSG RAN WG1 #76, R1-140364, pp. 1-2, (Feb. 10-14, 2014).
(Continued)

*Primary Examiner* — Dang T Ton
(74) *Attorney, Agent, or Firm* — BROOKS KUSHMAN P.C.

(57) ABSTRACT

The present disclosure provide a resource pool configuration method, a resource pool using method, a configuration device, and a terminal. The resource pool obtaining method is applied to a terminal, including: obtaining a first resource pool in at least one of the following manners: obtaining the predefined first resource pool; obtaining the preconfigured first resource pool; or obtaining the configured first resource pool.

20 Claims, 2 Drawing Sheets

---

Obtain a first resource pool in at least one of the following manners: obtaining the predefined first resource pool; obtaining the preconfigured first resource pool; or obtaining the configured first resource pool

101

Related U.S. Application Data continuation of application No. PCT/CN2019/102515, filed on Aug. 26, 2019.

(51) Int. Cl.
*H04W 56/00* (2009.01)
*H04W 72/044* (2023.01)
*H04W 72/543* (2023.01)

(58) Field of Classification Search
USPC .................................. 370/329, 40, 403, 400
See application file for complete search history.

(56) References Cited

U.S. PATENT DOCUMENTS

| | | | |
|---|---|---|---|
| 2017/0215203 | A1 | 7/2017 | Lee et al. |
| 2017/0303240 | A1 | 10/2017 | Basu Mallick et al. |
| 2018/0020365 | A1 | 1/2018 | Xiong et al. |
| 2018/0098331 | A1 | 4/2018 | Zhao et al. |
| 2018/0160418 | A1 | 6/2018 | Luo et al. |
| 2021/0044956 | A1 | 2/2021 | Kim |
| 2023/0180264 | A1* | 6/2023 | Kim .................. H04B 7/0695 455/414.1 |

FOREIGN PATENT DOCUMENTS

| | | |
|---|---|---|
| CN | 106211332 A | 12/2016 |
| CN | 107113803 A | 8/2017 |
| CN | 107211470 A | 9/2017 |
| CN | 108141847 A | 6/2018 |
| CN | 108400837 A | 8/2018 |
| EP | 3 275 268 A1 | 1/2018 |
| WO | 2016/153548 A1 | 9/2016 |
| WO | 2016/163106 A1 | 10/2016 |

OTHER PUBLICATIONS

Sony., "D2D Communication Resource Scheduling," 3GPP TSG-RAN WG1 Meeting #76, R1-140589, (Feb. 10-14, 2014).
Sony., "D2D Resource Pool and Scheduling Assignments," 3GPP TSG-RAN WG1 Meeting #76bis, R1-141571, (Mar. 31-Apr. 4, 2014).
Alcatel-Lucent Shanghai Bell, et al., "Resource allocation for D2D broadcast communication," 3GPP TSG RAN WG1 Meeting #77, R1-142055, pp. 1-7, (May 19-13, 2014).
Qualcomm Incorporated, et al., "Introduction of ProSe," 3GPP TSG-RAN WG2 #86, R2-142750, (May 19-23, 2014).
Intel Corporation., "On Remaining Details of Resource Pool Configuration for D2D Communication," 3GPP TSG RAN WG1 Meeting #78bis, R1-143763, pp. 1-7, (Oct. 6-10, 2014).
Intel Corporation., "Remaining details of D2D discovery resource allocation," 3GPP TSG RAN WG1 Meeting #78bis, R1-143766, pp. 1-8, (Oct. 6-10, 2014).
CATT., "Missing Packet due to Half-duplex in PC5," 3GPP TSG RAN WG2 Meeting #90, R2-152247, pp. 1-4, (May 25-29, 2015).
Nokia, et al., "On resource pool design," 3GPP TSG RAN WG1 Meeting #84bis, R1-162541, (Apr. 11-15, 2016).
Samsung., "Remaining issues related to Tx resource selection and pool usage," 3GPP TSG-RAN WG2 Meeting #95bis, R2-166658, pp. 1-5, (Oct. 10-14, 2016).
Intel Corporation., "Design Options for eNB-Controlled and Relay UE-Assisted Resource Allocation," 3GPP TSG RAN WG1 Meeting #90, R1-1712519, pp. 1-7, (Aug. 21-25, 2017).
Panasonic., "Discussion on supporting unicast, groupcast and broadcast via NR sidelink," 3GPP TSG RAN WG1 Meeting #94, R1-1808646, pp. 1-3, (Aug. 20-24, 2018).
NTT Docomo, Inc., "Resource allocation mechanism," 3GPP TSG RAN WG1 Meeting #94, R1-1809159, pp. 1-7, (Aug. 20-24, 2018).
Ericsson., "On coexistence aspects of NR V2X," 3GPP TSG-RAN WG1 Meeting #94, R1-1809313, (Aug. 20-24, 2018).
ITL., "Discussion on NR V2X Synchronization mechanism," 3GPP TSG-RAN WG1 Meeting #94, R1-1809475, pp. 1-4, (Aug. 20-24, 2018).
International Search Report and Written Opinion of the International Searching Authority dated Nov. 27, 2019 as received in Application No. PCT/CN2019/102515.
CN Office Action dated Sep. 2, 2021 as received in Application No. 201811126468.X.
Extended European Search Report dated Oct. 28, 2021 as received in Application No. 19864058.3.
JP First Office Action dated May 31, 2022 as received in Application No. 2021-517375.
JP Second Office Action dated Oct. 11, 2022 as received in Application No. 2021-517375.
US Office Action dated Mar. 21, 2023 as received in U.S. Appl. No. 17/214,601.
First Office Action for U.S. Appl. No. 18/498,888 dated Aug. 8, 2024, 21 Pages.

* cited by examiner

RESOURCE POOL CONFIGURATION METHOD, RESOURCE POOL USING METHOD, CONFIGURATION DEVICE, AND TERMINAL

CROSS-REFERENCE OF RELATED APPLICATION

This application claims the benefit of and is a continuation application of U.S. patent application Ser. No. 17/214,601 filed on Mar. 26, 2021. U.S. patent application Ser. No. 17/214,601 claims the benefit of and is a continuation application of a PCT Application No. PCT/CN2019/102515 filed on Aug. 26, 2019. PCT Application No. PCT/CN2019/102515 claims priority to Chinese Patent Application No. 201811126468.X, filed on Sep. 26, 2018 in china. Each of the above-listed applications is incorporated herein by reference in its entirety.

TECHNICAL FIELD

The present disclosure relates to the technical field of communications, and in particular, to a resource pool configuration method, a resource pool using method, a configuration device, and a terminal.

BACKGROUND

Two types of terminals perform transmission on a sidelink:
1. A terminal of a configuration A: A network device sends allocation of a sidelink transmission resource on a current carrier. After receiving the allocation information, the terminal performs selection and performs sidelink transmission according to the sidelink transmission resource indicated by the network device.
2. A terminal of a configuration B: The terminal selects a sidelink transmission resource from a resource pool preconfigured by a manufacturer.

On a long term evolution (LTE) sidelink, the sidelink reuses an uplink resource of LTE. A sidelink terminal sends a primary sidelink synchronization signal (PSSS), a secondary sidelink synchronization signal (SSSS), and a master information block-SL-V2X (MIB-SL-V2X) on a sidelink. The PSSS and the SSSS are used to help the terminal receive subframe-level timing information. MIB-SL-V2X carries information such as tdd-config, a direct frame number (DFN), and a bandwidth. The DFN provides frame-level timing information. tdd-config provides an UL (uplink)/DL (downlink) configuration. For simplicity, a resource used to transmit the PSSS, the SSSS, and MIB-SL-V2X may be referred to as a sidelink synchronization resource for short. The terminal of configuration A sends, in MIB-SL-V2X, tdd-config obtained from the network device, while the terminal of configuration B sends preconfigured tdd-config in MIB-SL-V2X.

The terminal first determines uplink subframes, downlink subframes, and special subframes in a radio resource according to tdd-config. Then, the terminal removes, from the radio resource, resources occupied by downlink subframes and sidelink synchronization resources, arranges the remaining resources in chronological order, and numbers according to 10 ms as a sidelink frame, where the number is the DFN.

A schematic diagram is shown in FIG. 1. It is assumed that UL subframes are all reused in SL transmission, where a subframe 8 in a system frame number (SFN) 1 is used for transmission of an SL synchronization signal.

The terminal of configuration A may obtain related information of tdd-config and sidelink synchronization resources from the network device. The terminal of configuration B may only obtain tdd-config and determine sidelink synchronization resources from a preconfiguration of a manufacturer usually because there is no network coverage.

There are only six types of uplink and/or downlink configurations supported in LTE, and a configuration unit is subframe. Moreover, there are dozens of uplink and/or downlink configurations supported in new radio ((NR), where a configuration unit may be symbol. The network may change the uplink and/or downlink configurations dynamically at any time. In addition, in subsequent evolution, the number of supported configurations may continue to be expanded.

In NR, the network supports uplink and downlink configurations very flexibly, and signaling overheads required for indicating the configurations are much higher than those in LTE. On the one hand, carrying the uplink and downlink configurations in MIB-SL-V2X requires very high overheads. On the other hand, uplink and downlink configurations preconfigured by the manufacturer are limited. The uplink and downlink configurations configured by the network and the uplink and downlink configurations preconfigured by the manufacturer may be different very likely, and sidelink resources are also different, resulting in mutual interference. In addition, in this case, even if the terminals of the two configurations have absolute timing alignment or the same synchronization source, and use the same sidelink resource, the two types of terminals may understand the DFN differently, resulting in mutual interference.

SUMMARY

The present disclosure provides a resource pool configuration method, a resource pool using method, a configuration device, and a terminal.

According to a first aspect, an embodiment of this disclosure provides a resource pool obtaining method, applied to a terminal. The method includes:
  obtaining a first resource pool in at least one of the following manners: obtaining the predefined first resource pool; obtaining the preconfigured first resource pool; or obtaining the configured first resource pool.

According to a second aspect, an embodiment of the present disclosure provides a resource pool configuration method, applied to a resource pool configuration device. The method includes:
  configuring a first resource pool of a terminal.

According to a third aspect, an embodiment of the present disclosure provides a terminal. The terminal includes:
  an obtaining module, configured to obtain a first resource pool in at least one of the following manners: obtaining the predefined first resource pool; obtaining the preconfigured first resource pool; or obtaining the configured first resource pool.

According to a fourth aspect, an embodiment of the present disclosure provides a resource pool configuration device. The resource pool configuration device includes:
  a configuration module, configured to configure a first resource pool of a terminal.

According to a fifth aspect, an embodiment of the present disclosure provides a communication device, including: a memory, a processor, and a computer program that is stored in the memory and that can run on the processor, where when the computer program is executed by the processor, steps in the foregoing resource pool obtaining method are implemented, or steps in the foregoing resource pool configuration method are implemented.

According to a sixth aspect, an embodiment of the present disclosure provides a computer readable storage medium. The computer readable storage medium stores a computer program. The computer program, when executed by a processor, implements the steps in the foregoing resource pool obtaining method or the steps in the foregoing resource pool configuration method.

The embodiments of the present disclosure have the following beneficial effects:

In the above solution, the first resource pool of the terminal is predefined and/or preconfigured and/or configured, mutual interference between terminals with different configurations can be avoided.

DETAILED DESCRIPTION OF EMBODIMENTS

To make the to-be-resolved technical problems, technical solutions, and advantages in the embodiments of the present disclosure clearer, detailed descriptions are provided below with reference to the accompanying drawings and specific embodiments.

The embodiments of the present disclosure provide a resource pool configuration method, a resource pool using method, a configuration device, and a terminal, to avoid mutual interference between terminals with different configurations. The technical solution of the embodiments is not only applicable to sidelink communication, but also applicable to other communication systems. A sidelink is also referred to as a sidelink and a direct link, which belong to the same concept and correspond to sidelink in English.

In different communication systems, the name and abbreviation of the signal in the present disclosure change correspondingly. When the abbreviation changes, the technical solution of the present disclosure is still applicable.

Figures 1, 2, 3, 4, 5:
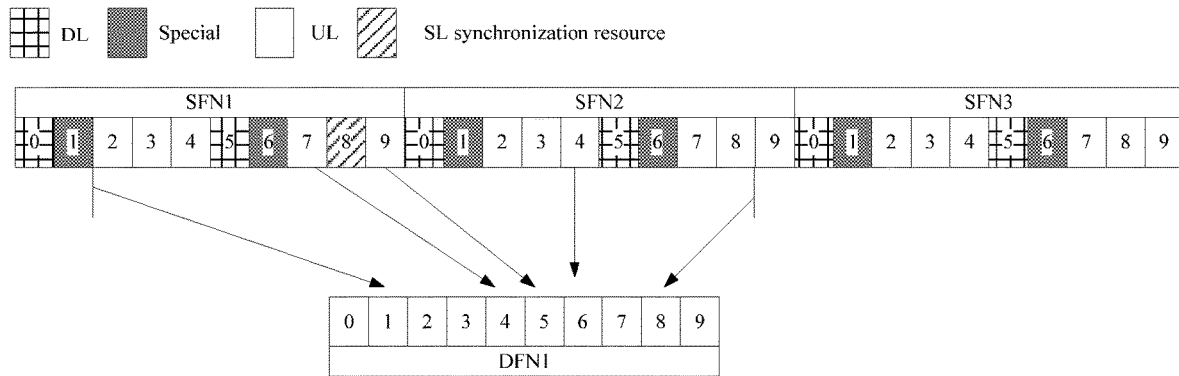
FIG. 1 is a schematic diagram of obtaining a DFN.
FIG. 2 is a schematic flowchart of a resource pool obtaining method according to an embodiment of the present disclosure.
FIG. 3 is a schematic flowchart of a resource pool configuration method according to an embodiment of the present disclosure.
FIG. 4 is a schematic structural diagram of a terminal according to an embodiment of the present disclosure.
FIG. 5 is a schematic structural diagram of a resource pool configuration device according to an embodiment of the present disclosure.

An embodiment of the present disclosure provides a resource pool obtaining method, applied to a terminal. As shown in FIG. 2, the method includes:

Step 101: Obtain a first resource pool in at least one of the following manners: obtaining the predefined first resource pool; obtaining the preconfigured first resource pool; or obtaining the configured first resource pool.

In the embodiments, the first resource pool of the terminal is predefined and/or preconfigured and/or configured, mutual interference between terminals with different configurations can be avoided.

Further, the method further includes:
monitoring the first resource pool according to a monitoring procedure.

Further, the monitoring the first resource pool according to a monitoring procedure includes at least one of the following:
monitoring the first resource pool in a first time window, including: monitoring the first resource pool for F times, or monitoring the first resource pool for a maximum of F times in the first time window; or monitoring the first resource pool for a minimum of F times in the first time window, where F is a positive integer;
monitoring the first resource pool according to a first periodicity;
monitoring the first resource pool when a corresponding transmission configuration or a corresponding transmission mode is used; or
monitoring the first resource pool when transmission of another resource pool meets a corresponding condition.

The monitoring procedure is a predefined and/or preconfigured and/or configured procedure corresponding to the first resource pool. The first time window may be predefined and/or preconfigured and/or configured. The first periodicity may be predefined and/or preconfigured and/or configured. The corresponding transmission configuration is a predefined and/or preconfigured and/or configured transmission configuration corresponding to the first resource pool. The corresponding transmission mode is a predefined and/or preconfigured and/or configured transmission mode corresponding to the first resource pool. The corresponding condition is a predefined and/or preconfigured and/or configured condition corresponding to the first resource pool.

Further, the corresponding transmission configuration or the corresponding transmission mode includes at least one of the following:
when broadcasting is needed;
when beam sweeping is needed;
when connection fails;
when a resource pool is reconfigured;
when a resource pool is added;
when a resource pool is released;
when quasi-co-location QCL information cannot be obtained; or
when a synchronization source that meets a requirement cannot be found.

Further, the corresponding condition includes at least one of the following:
a bit error rate is higher than a threshold;
a block error rate is higher than a threshold;
a false alarm rate exceeds a threshold;
beam failure recovery;
connection failure recovery; or
connection re-establishment.

Further, the monitoring the first resource pool includes at least one of the following:
performing synchronization in the first resource pool;
performing measurement in the first resource pool;
performing transmission in the first resource pool; or
performing sensing in the first resource pool.

Further, a measurement measured by the terminal in the first resource pool includes at least one of the following:
reference signal received power RSRP;
reference signal received quality RSRQ; or
received signal strength indicator RSSI.

Further, content transmitted in the first resource pool includes at least one of the following:
- a public security service, a basic V2X service, or a period-type service.

Further, content transmitted in the first resource pool includes at least one of the following:
- a broadcast message, a synchronization signal, configuration information of another resource pool, a correspondence between a service and a resource pool, a correspondence between a transmission type and a resource pool, a discovery message, configuration information of an extra resource pool, or radio resource control information.

There is a correspondence between a synchronization signal and a resource of the resource pool.

Further, when the content transmitted in the first resource pool includes the configuration information of the another resource pool, the configuration information of the another resource pool is carried in at least one of the following: a first information block, a connection request, or a message of a subsequent step.

Further, the first resource pool includes at least one of the following:
- a time domain resource, a frequency domain resource, a subcarrier spacing SCS, a cyclic prefix CP, a bandwidth part BWP identifier, a cell identifier, a carrier identifier, a band identifier, a modulation and coding scheme MCS, a code rate, a precoding mode, an allowed synchronization source identifier, a priority configuration, power, or synchronization signal block information.

The BWP identifier is a BWP identifier corresponding to the first resource pool, for example, an identifier of a BWP of the first resource pool, for another example, an identifier of a BWP of another resource pool associated with the first resource pool. The cell identifier is a cell identifier corresponding to the first resource pool, for example, an identifier of a cell of the first resource pool, for another example, an identifier of a cell of another resource pool associated with the first resource pool. The carrier identifier is a carrier identifier corresponding to the first resource pool, for example, an identifier of a carrier of the first resource pool, for another example, an identifier of a carrier of another resource pool associated with the first resource pool. The band identifier is a band identifier corresponding to the first resource pool, for example, an identifier of a band of the first resource pool, for another example, an identifier of a band of another resource pool associated with the first resource pool. The correspondence between another resource pool associated with the first resource pool and the first resource pool may be that one is used to send a message and the other is used to receive the message of the former; or may be that one is used to transmit scheduling information and the other is used to transmit scheduled data corresponding to the former; or may be that one is used to initiate a connection request, and the other is used to feed back a connection request and/or perform transmission in subsequent steps after connection succeeds.

Further, the obtaining a first resource pool in at least one of the following manners: obtaining the predefined first resource pool; obtaining the preconfigured first resource pool; and obtaining the configured first resource pool includes at least one of the following:
- obtaining the first resource pool configured by the network side device;
- or obtaining the first resource pool configured by the another terminal.

Further, at least two of the predefined first resource pool, the first resource pool configured by the network side device, the first resource pool configured by the another terminal, and the preconfigured first resource pool are compatible, and being compatible includes at least one of the following:
- frequency domain resources are same, time domain resources are same, a frequency domain resource range of one is included in a frequency domain resource range of the other, and a time domain resource range of one is included in a time domain resource range of the other.

Further, the first resource pool includes at least one resource pool entity, and the method further includes:
- determining at least one resource pool entity used in the first resource pool. The resource pool entity may be a resource pool, or may be a time domain and/or frequency domain resource set. For example, a resource pool is divided into a plurality of subchannels. If the first resource pool includes only one resource pool entity, the first resource pool is also one resource pool entity. If the first resource pool includes a plurality of resource pool entities, the first resource pool is a collective name of resource pool entities having a same property.

Further, at least one resource pool entity used in the first resource pool is determined in at least one of the following manners:
- selecting a resource pool entity for monitoring from the first resource pool based on at least one of a predefined evaluation criteria, a preconfigured evaluation criteria, or a configured evaluation criteria; or
- selecting a resource pool entity for monitoring from the first resource pool based on indication information sent by the network side device and/or another terminal.

Further, the evaluation criterion includes at least one of the following:
- a measurement result, a priority of the resource pool entity, a service type supported by the resource pool entity, a transmission type supported by the resource pool entity, a load state of the resource pool entity, an SCS of the resource pool entity, a CP of the resource pool entity, a communication range of the resource pool entity, a power limit of the resource pool entity, or a service quality QoS requirement of the resource pool entity.

Further, a form of the indication information includes at least one of the following:
- a bitmap;
- an absolute identifier of the resource pool entity; or
- a relative identifier of a resource pool entity relative to a total number of resource pool entities in the first resource pool.

The absolute identifier of the resource pool entity is an identifier based on a number of actually configured resource pool entities or a maximum number of resource pool entities. When M resource pool entities are configured, 0 to M−1 or 1 to M are used as identifiers of the resource pool entities. Alternatively, when a maximum of M resource pool entities are configured, 0 to M−1 or 1 to M are used as identifiers of the resource pool entities.

Further, when the first resource pool is configured by another terminal, configuration information of the first resource pool is carried by a sidelink primary information block and/or another broadcast message sent by the another terminal on a sidelink.

Further, the first resource pool cannot be reconfigured. For example, the network device is not allowed to reconfigure the first resource pool by updating system information and/or by using RRC signaling and/or by using RRC signaling reconfiguration. For another example, another terminal is not allowed to reconfigure the first resource pool.

Further, the method further includes:
obtaining a reconfigured first resource pool, where the reconfigured first resource pool is the same as or compatible with at least one of the following: the predefined first resource pool, the preconfigured first resource pool, or the configured first resource pool. For example, the network device reconfigures the first resource pool by using updated system information and/or RRC signaling and/or reconfigured RRC signaling. The first resource pool that is reconfigured is the same as or compatible with the first resource pool that is not reconfigured. For another example, another terminal reconfigures the first resource pool for the terminal. The first resource pool that is reconfigured is the same as or compatible with the first resource pool that is not reconfigured.

Being compatible is: a time domain range and/or frequency domain range of the first resource pool that is reconfigured includes a time domain range and/or frequency domain range of the first resource pool that is not reconfigured.

Further, an identifier of the first resource pool is predefined in a protocol and/or configured by the network side device and/or configured and/or preconfigured by another terminal.

Further, the identifier of the first resource pool is a maximum value N or a minimum value N of allowed resource pool identifiers, where N is greater than or same to 1.

Further, the method further includes:
obtaining configuration information of at least one second resource pool that is configured by a received resource pool configuration and/or predefined and/or preconfigured, and using the at least one second resource pool as a resource pool that is used subsequently; or
obtaining configuration information of at least one second resource pool that is configured by a received resource pool configuration and/or predefined and/or preconfigured, selecting at least one second resource pool from the at least one second resource pool as a resource pool that is used subsequently, and sending an identifier of the selected re source pool to the resource pool configuration device.

The resource pool configuration device is a network side device or another terminal, and/or represents at least one of connected objects.

Further, a granularity of a time domain and/or frequency domain resource of the first resource pool is a multiple of a total beam number, or a granularity of a time domain and/or frequency domain resource of the first resource pool is a multiple of a total synchronization signal block number. For example, there is a correspondence between a resource of the first resource pool and a total number of beams. For example, there is a correspondence between a resource of the first resource pool and a total number of synchronization signal blocks.

An embodiment of the present disclosure further provides a resource pool configuration method, applied to a resource pool configuration device. As shown in FIG. 3, the method includes:

Step 201: Configure a first resource pool of a terminal.

In the embodiments, the first resource pool of the terminal is predefined and/or preconfigured and/or configured, so that mutual interference between different terminals with different configurations can be avoided.

Further, the first resource pool includes at least one of the following:
a time domain resource, a frequency domain resource, a subcarrier spacing SCS, a cyclic prefix CP, a bandwidth part BWP identifier, a cell identifier, a carrier identifier, a band identifier, a modulation and coding scheme MCS, a code rate, a precoding mode, an allowed synchronization source identifier, a priority configuration, power, and synchronization signal block information.

Further, the resource pool configuration device includes at least one of a network side device or another terminal.

Further, the first resource pool includes at least one resource pool entity, and the method further includes:
configuring a resource pool entity used by the terminal in the first resource pool.

Further, the resource pool entity used by the terminal in the first resource pool is configured in at least one of the following manners:
configuring an evaluation criterion for selecting the resource pool entity; or
sending indication information to the terminal, where the indication information instructs to select the resource pool entity from the first resource pool.

Further, the evaluation criterion includes at least one of the following:
a measurement result, a priority of the resource pool entity, a service type supported by the resource pool entity, a transmission type supported by the resource pool entity, a load state of the resource pool entity, an SCS of the resource pool entity, a cyclic prefix CP of the resource pool entity, a communication range of the resource pool entity, a power limit of the resource pool entity, or a service quality QoS requirement of the resource pool entity.

Further, a form of the indication information includes at least one of the following:
a bitmap;
an absolute identifier of the resource pool entity; or
a relative identifier of a resource pool entity relative to a total number of resource pool entities in the first resource pool.

Further, when the resource pool configuration device is another terminal, configuration information of the first resource pool is carried by a sidelink primary information block and/or another broadcast message sent by the another terminal on a sidelink.

Further, the first resource pool cannot be reconfigured.

Further, the user equipment further includes:
The first resource pool of the terminal is reconfigured, where the reconfigured first resource pool and the configured first resource pool are the same or compatible.

Further, at least two of the predefined first resource pool, the first resource pool configured by the network side device, the first resource pool configured by the another terminal, or the preconfigured first resource pool are compatible, and being compatible includes at least one of the following:
frequency domain resources are same, time domain resources are same, a frequency domain resource range of one is included in a frequency domain resource range of the other, or a time domain resource range of one is included in a time domain resource range of the other.

Further, an identifier of the first resource pool is predefined in a protocol and/or configured by the network side device and/or configured and/or preconfigured by another terminal.

Further, the identifier of the first resource pool is a maximum value N or a minimum value N of allowed resource pool identifiers, where N is greater than or same to 1.

Further, the method further includes:
sending configuration information of at least one second resource pool to the terminal; or
sending configuration information of at least one second resource pool to the terminal, and receiving an identifier of selected at least one second resource pool that is returned by the terminal.

Further, a granularity of a time domain and/or frequency domain resource of the first resource pool is a multiple of a total beam number, or a granularity of a time domain and/or frequency domain resource of the first resource pool is a multiple of a total synchronization signal block number.

In the technical solutions of the present disclosure, the first resource pool is predefined and/or configured and/or preconfigured, so that mutual interference between terminals with different configurations is avoided. This design may be not only used in an NR system and a sidelink, but also may be used in other services or other systems such as subsequent evolved communications systems.

It should be noted that sidelink transmission refers to transmission on a sidelink, including at least one of communication services on a sidelink such as device-to-device (D2D for short) and vehicle-to-everything (V2X for short). V2X mainly includes at least one of vehicle-to-vehicle (V2V for short) communication, vehicle-to-infrastructure (V2I for short) communication, vehicle-to-network (V2N for short) communication, and vehicle-to-pedestrian (V2P for short) communication.

The first resource pool may be predefined in a protocol, and/or preconfigured by the manufacturer of the terminal, and/or configured by a network side device, and/or configured by another terminal, to transmit an initial and/or default and/or public and/or shared message (and/or service) by the terminal. The transmission includes at least one of reception and sending. The network side device includes at least one of a base station, a roadside unit RSU, and other network devices.

The first resource pool may be referred to as an initial resource pool, a default resource pool, a common resource pool, a first resource pool, a shared resource pool, a global resource pool, and a fallback resource pool. The first resource pool may be used as at least one of an initial resource pool, a default resource pool, a common resource pool, a shared resource pool, a global resource pool, and a fallback resource pool.

1. In the embodiments, after the terminal obtains the first resource pool, the terminal needs to monitor the first resource pool according to a specific requirement. The requirement may be predefined in a protocol, preconfigured, configured by the network side device, and/or configured by another terminal. The requirement may be at least one of the following:

The terminal needs to monitor the first resource pool at least for F times and/or needs to monitor the first resource pool at most for F times and/or needs to monitor the first resource pool for F times in a time P, where F is a positive integer.

The terminal needs to monitor the first resource pool at least based on the period of P1.

The terminal monitors the first resource pool in a specific transmission configuration or transmission mode. For example, the terminal needs to monitor the first resource pool during broadcast, or needs to monitor the first resource pool during beam sweeping, or needs to monitor the first resource pool when the connection fails, or needs to monitor the first resource pool during resource pool reconfiguration, or needs to monitor the first resource pool when adding a resource pool, or needs to monitor the first resource pool when releasing a resource pool, or needs to monitor the first resource pool when quasi co-location QCL information cannot be obtained, or needs to monitor the first resource pool when a synchronization source that meets a requirement cannot be found.

That a synchronization source that meets a requirement cannot be found may be at least one of the following situations: a reliable gnss cannot be found, a cell that may be camped on cannot be found, a suitable cell cannot be found, a synchronization signal that is sent by another terminal and/or device and meets a measurement requirement cannot be found, and the like. Not meeting a measurement requirement may be that at least one of measurements such as RSRP, RSRQ, and RSSI does not meet a threshold requirement.

When transmission on another resource pool meets a preset condition, it is necessary to monitor the first resource pool, where the preset condition includes at least one of the following: a bit error rate is higher than a threshold, a block error rate is higher than a threshold, a false alarm rate exceeds a threshold, beam failure recovery, connection failure recovery, or connection reestablishment.

2. The monitoring the first resource pool by the terminal includes at least one of the following:

The terminal and the first resource pool are synchronized, the terminal measures in the first resource pool, the terminal transmits in the first resource pool, and the terminal monitors in the first resource pool, where the transmission includes at least one of receiving and sending.

The measurement measured by the terminal in the first resource pool includes at least one of reference signal received power (RSRP), reference signal received quality (RSRQ), and received signal strength indicator (RSSI).

3. The first resource pool includes at least one of a time domain resource, a frequency domain resource, a subcarrier spacing (SCS), a cyclic prefix (CP), a bandwidth part (BWP) identifier, a cell identifier, a carrier identifier, a band identifier, a modulation and coding scheme (MCS), a code rate, a precoding mode, an allowed synchronization source identifier, a priority configuration, a scrambled ID, power, or synchronization signal block information.

The time domain resource includes at least one of a period, a time domain offset (frame/subframe/slot/OFDM symbol level), an occupied time domain symbol (bitmap), and the like.

The frequency domain resource includes at least one of a frequency domain location, a bandwidth, and the like.

The CP includes at least one of a conventional CP, an extended CP, and the like.

The BWP identifier includes a BWP ID of at least one BWP.

The cell identifier includes a cell ID of at least one cell.

The carrier identifier includes a carrier ID of at least one carrier.

The allowed synchronization source identifier indicates that the terminal that directly or indirectly uses synchronization sources corresponding to the identifier may use the first resource pool for transmission.

The priority configuration indicates a priority of the terminal using different synchronization sources and/or different states during transmission in the first resource pool.

The scrambled ID is, for example, a scrambled ID generated for measuring a signal sequence, for example, the measurement sequence is a gold sequence, and initialization of the gold sequence is related to the scrambled ID.

The power includes at least one of the following: transmit power of a synchronization signal in the first resource pool, transmit power of a measurement signal or an offset of the transmit power of the measurement signal relative to the transmit power of the synchronization signal, and transmit power of a reference signal or an offset of the transmit power of the reference signal relative to the transmit power of the synchronization signal; or transmit power of a broadcast channel, transmit power of a measurement signal or an offset of the transmit power of the measurement signal relative to the transmit power of the broadcast channel, and transmit power of a reference signal or an offset of the transmit power of the reference signal relative to the transmit power of the broadcast channel.

The synchronization signal block information includes a maximum number of synchronization signal blocks in the first resource pool and synchronization signal blocks actually sent in the first resource pool.

4. The first resource pool may be configured for the terminal by using at least one of methods of predefining in a protocol, configuring by the network side device, configuring by another terminal, or preconfiguring.

The first resource pool includes at least one resource pool entity (that is, a plurality of resource pools may be included and are collectively referred to as the first resource pool).

Optionally, when the first resource pool includes a plurality of resource pool entities, the terminal configured with the first resource pool may operate on only at least one of the resource pool entities (a subset or a universal set of the first resource pool).

Optionally, at least one resource pool includes only one resource pool.

Optionally, at least one resource pool may be determined in at least one of the following manners:

1. The at least one resource pool is determined based on an evaluation criterion, where the evaluation criterion includes at least one of the following:
   a measurement result, a priority of the resource pool entity, a service type supported by the resource pool entity, a transmission type supported by the resource pool entity, a load state of the resource pool entity, an SCS of the resource pool entity, a cyclic prefix CP of the resource pool entity, a communication range of the resource pool entity, a power limit of the resource pool entity, or a service quality (QoS) requirement of the resource pool entity.

The evaluation criterion may be predefined in a protocol, preconfigured, configured by the network side device, or configured by another terminal.

2. The network side device and/or another terminal sends indication information to indicate the at least one resource pool entity. A form of the indication information may include:
   bitmap;
   an absolute identifier of the resource pool entity; or
   a relative identifier of a resource pool entity relative to a total number of resource pool entities in the first resource pool.

The at least one resource pool entity is predefined in a protocol and/or preconfigured by a manufacturer of the terminal.

If the first resource pool is configured by another terminal, configuration information of the first resource pool may be carried by MIB-SL-V2X and/or another broadcast message sent by the another terminal on a sidelink.

5. The first resource pool cannot be reconfigured by the network side device and the another terminal, or although the first resource pool is reconfigured, the resource pool configuration device ensures that content of the first resource pool after reconfiguration is the same as that of the first resource pool before reconfiguration.

6. At least two of the predefined first resource pool, the preconfigured first resource pool, and the configured first resource pool are compatible, and being compatible includes at least one of the following:
   frequency domain resources are same, time domain resources are same, a frequency domain resource range of one is included in a frequency domain resource range of the other, or a time domain resource range of one is included in a time domain resource range of the other.

7. An identifier of the first resource pool is predefined in a protocol and/or configured by the network side device side and/or configured and/or preconfigured by another terminal.

Optionally, a configuration identifier is a maximum value N or a minimum value N of allowed resource pool identifiers, where $N \geq 1$.

In a specific embodiment, the first resource pool includes one resource pool entity, where an ID of the resource pool entity is an ID of the first resource pool, that is, 0.

In another specific embodiment, the first resource pool includes M resource pool entities, and the identifier of the first resource pool is the minimum value N of allowed resource pool identifiers. When N=M, resource pool identifiers of the M resource pool entities separately correspond to 0, 1, 2, . . . and M−1. When N=1, the first resource pool corresponds to the resource pool identifier 0, and also corresponds to relative resource pool identifiers 0, 1, 2, . . . and M−1.

8. The terminal transmits (includes sending and/or receiving) in the first resource pool, where content of the transmission includes at least one of the following.
   a broadcast message, a synchronization signal, a public security service, a basic V2X service, a periodic service, configuration information of another resource pool, a correspondence between a service and a resource pool, a correspondence between a transmission type and a resource pool, discovery information, configuration information of an extra resource pool, or radio resource control information.

The correspondence between a service and a resource pool may be mapping between a service ID (for example, PSID) and a resource pool. For example, different PSIDs correspond to different resource pools and/or different resource pool IDs. The correspondence between a transmission type and a resource pool may be mapping between a service transmission type (for example, at least one of broadcast, unicast, or multicast) and a resource pool. For example, different transmission types correspond to different resource pools and/or different resource pool IDs. The discovery information is used to discover a service, and/or discover another terminal, and/or discover a terminal group, and the like. RRC information includes at least one of a unicast connection request, response, reestablishment, and the like, and at least one of a multicast connection request, response, reestablishment, and the like.

9. When the transmission content includes the configuration information of another resource pool, the configuration information may be carried in a first information block or may be carried in a connection request or a message of a subsequent step.

10. When the terminal is a target receive end of a connection request and a transmit end initiates the connection request and sends resource pool indication information to the target receive end (the indication information indicates a single resource pool or a plurality of resource pools), the target receive end obtains the configuration information of the another resource pool and performs the following steps on the indicated resource pool, including but not limited to, synchronization, measurement, transmission, monitoring, and the like.

Alternatively, when the transmit end initiates a connection request and sends resource pool indication information to the target receive end (the indication information indicates a single resource pool or a plurality of resource pools), and the target receive end obtains the configuration information of the another resource pool, the target receive end selects at least one resource pool from resource pools indicated by the indication information, feeds back an identifier of the at least one resource pool to the transmit end, and performs the following steps on the at least one resource pool, including but not limited to, synchronization, measurement, transmission, monitoring, and the like.

11. When the terminal receives a subsequently configured resource pool as a receive end and selects a resource pool to be used subsequently, the terminal preferentially selects a resource pool that completely overlaps a resource pool of the terminal, or a resource pool partially overlaps a resource pool of the terminal, or a resource pool with high quality.

The overlapping refers to overlapping of time domain resources and/or overlapping of frequency domain resources. The high quality is that a measurement result of at least one of RSRP, RSSI, and RSRQ is higher than a threshold.

12. A granularity of a time domain and/or frequency domain resource of the first resource pool is a multiple of a total beam number, or a granularity of a time domain and/or frequency domain resource of the first resource pool is a multiple of a total synchronization signal block number. A configuration of another resource pool is more flexible.

For example, there is a correspondence between a resource of the first resource pool
and a total number of beams.

For example, there is a correspondence between a resource of the first resource pool and a total number of synchronization signal blocks.

The usage of the first resource pool is further described below with reference to specific embodiments:

Embodiment 1

In this embodiment, the first resource pool and another resource pool are predefined and/or configured and/or pre-configured for the terminal. Different resource pools may correspond to different specific transmission configurations and/or transmission modes.

For example:
The first resource pool is mainly used for a broadcast service, while another resource pool is mainly used for multicast and unicast services. Generally, the broadcast service requires a wide coverage range and may require massive beam sweeping, while in multicast and unicast services, sending and receiving are performed only for one or more specific terminals. Therefore, a small number of beams can usually meet the coverage requirement.

Therefore, in a specific implementation, there is a correspondence between a resource pool and a specific transmission configuration and/or transmission mode.

Broadcast data is transmitted in the first resource pool and unicast and/or multicast transmission is performed on another resource pool.

Optionally, when the terminal on another resource pool needs broadcast transmission, the terminal switches to the first resource pool for broadcast sending and receiving.

Optionally, when the terminal in the first resource pool needs unicast and/or multicast transmission, the terminal switches to another resource pool for unicast and/or multicast sending and receiving.

Optionally, the resource pools for unicast sending and receiving and multicast sending and receiving may also be different.

In another specific implementation, there is a correspondence between a resource pool and beam sweeping.

Transmission of beam sweeping is performed in the first resource pool, and transmission that only needs a small number of beams to meet the transmission coverage requirement is performed on another resource pool. These transmissions may be based on a small amount of beam QCL (quasi co-location) information.

Optionally, when the terminal on another resource pool needs to perform beam sweeping, the terminal switches to the first resource pool for beam sweeping.

Optionally, when the terminal in the first resource pool only needs a small number of beams to meet the transmission coverage requirement, the terminal switches to another resource pool for corresponding transmission.

In another specific implementation, there is a correspondence between a resource pool and a monitoring manner of a search space.

There are two monitoring manners: one manner is mapping monitoring: according to a correspondence between a specific signal and a search space, an occasion in which the terminal currently needs to monitor in the search space is determined based on the specific signal; the other manner is configuration monitoring: according to a configuration indication of a search space, monitoring is performed in the search space.

The search space is monitored based on mapping sensing in the first resource pool, and the configuration monitoring is performed based on the instruction of the network device and/or another terminal on another resource pool.

Optionally, when the terminal on another resource pool cannot be configured with a dedicated (specific) search space or needs to perform configuration monitoring, the terminal needs to switch to the first resource pool.

Optionally, when the terminal in the first resource pool is configured to perform configuration monitoring, the first resource pool needs to include at least one other resource pool.

Optionally, the specific signal may be a synchronization signal block, or may be another reference signal that may be used for QCL reference, for example, a CSI-RS.

Embodiment 2

The first resource pool may be used as a fallback resource pool. For example, in at least one of cases of adding and/or deleting and/or reconfiguring a resource pool, adding and/or deleting and/or reconfiguring a control signal configuration, adding and/or deleting and/or reconfiguring a synchronize signal configuration, adding and/or deleting and/or reconfiguring a data signal configuration for the terminal, and the like, due to the time difference between obtaining of a new configuration and the updated configuration taking effect, the configured terminal cannot understand or directly apply the new configuration during this period. Therefore, the terminal cannot work normally based on the new configuration, and needs to fall back to the first resource pool for sending and receiving.

Therefore, in a specific implementation, the network side device reconfigures resource pool configuration information of the terminal. For example, a time domain resource of another resource pool is modified. In the present disclosure, the first resource pool cannot be reconfigured. In other words, even if reconfiguration is performed, the first resource pool after reconfiguration needs to be the same as the first resource pool before reconfiguration. Therefore, after reconfiguration, the terminal needs to switch to the first resource pool for sending and receiving.

Similarly, if the connection fails, for example, in at least one of cases in which a request to establish a unicast connection fails, a request to establish a multicast connection fails, a request to establish a radio link connection fails, a request to establish a beam pairing fails, and the like, because the terminal may fail due to poor signal quality or cannot continue to send and receive normally, the terminal needs to fall back to a relatively stable resource pool, that is, the first resource pool, for sending and receiving.

In another specific implementation, the terminal initiates a connection request to a terminal on another resource pool, for example, a unicast establishment request. The terminal that initiates the request does not receive a valid response within a specified time. Therefore, the request fails. In the present disclosure, the first resource pool cannot be reconfigured. In other words, even if reconfiguration is performed, content after reconfiguration needs to be the same as content before reconfiguration. Therefore, after the connection request, the terminal needs to switch to the first resource pool for sending and receiving.

Embodiment 3

The first resource pool may be used as a common resource pool for transmission of some broadcasting and/or common and/or regular services (messages). For example, the first resource pool is used for at least one of a public safety service (message), a basic V2X service (message), a periodic service (message), and the like.

Therefore, in a specific implementation, when the foregoing service is needed, corresponding transmission needs to be performed in the first resource pool.

When performing another service, for example, an advanced V2X service, for example, at least one of vehicle platooning, extended sensors, advanced driving, remote driving, and the like, corresponding transmission needs to be performed on another resource pool.

Optionally, when the terminal that performs transmission of another service on another resource pool needs to perform the above public and/or regular service (message), the terminal needs to switch to the first resource pool for corresponding transmission.

Optionally, when the terminal in the first resource pool needs to perform the above advanced V2X service, the terminal needs to switch to the corresponding another resource pool for corresponding transmission.

Optionally, there is a correspondence between different advanced V2X services and different resource pools.

An embodiment of the present disclosure further provides a terminal. As shown in FIG. 4, the terminal includes:
  an obtaining module 31, configured to obtain a first resource pool in at least one of the following manners: obtaining the predefined first resource pool; obtaining the preconfigured first resource pool; or obtaining the configured first resource pool.

In the embodiments, the first resource pool of the terminal is predefined and/or preconfigured and/or configured, mutual interference between different terminals with different configurations can be avoided.

Further, the terminal further includes:
  a monitoring module, configured to monitor the first resource pool according to a monitoring procedure.

Further, the monitoring module is specifically configured to execute at least one of the following:
  monitoring the first resource pool in a first time window for F times, where F is a positive integer;
  monitoring the first resource pool in a first time window for a maximum of F times;
  monitoring the first resource pool in a first time window for a minimum of F times;
  monitoring the first resource pool according to a first periodicity;
  monitoring the first resource pool when a corresponding transmission configuration or a corresponding transmission mode is used; or
  monitoring the first resource pool when transmission of another resource pool meets a corresponding condition.

Further, the corresponding transmission configuration or the corresponding transmission mode includes at least one of the following:
  when broadcasting is needed;
  when beam sweeping is needed;
  when connection fails;
  when a resource pool is reconfigured;
  when a resource pool is added;
  when a resource pool is released;
  when quasi-co-location QCL information cannot be obtained; or
  when a synchronization source that meets a requirement cannot be found.

Further, the corresponding condition includes at least one of the following:
  a bit error rate is higher than a threshold;
  a block error rate is higher than a threshold;
  a false alarm rate exceeds a threshold;
  beam failure recovery;
  connection failure recovery; or connection re-establishment.

Further, the monitoring module is specifically configured to execute at least one of the following:
  performing synchronization in the first resource pool;
  performing measurement in the first resource pool;
  performing transmission in the first resource pool; or
  performing sensing in the first resource pool.

Further, a measurement measured by the terminal in the first resource pool includes at least one of the following:
  reference signal received power RSRP;
  reference signal received quality RSRQ; or
  received signal strength indicator RSSI.

Further, content transmitted in the first resource pool includes at least one of the following:
  a broadcast message, a synchronization signal, a public security service, a basic V2X service, a periodic service, configuration information of another resource pool, a correspondence between a service and a resource pool, a correspondence between a transmission type and a resource pool, a discovery message, configuration information of an extra resource pool, or radio resource control information.

Further, when the content transmitted in the first resource pool includes the configuration information of the another resource pool, the configuration information of the another resource pool is carried in at least one of the following: a first information block, a connection request, or a message of a subsequent step.

Further, the first resource pool includes at least one of the following:
a time domain resource, a frequency domain resource, a subcarrier spacing SCS, a cyclic prefix CP, a bandwidth part BWP identifier, a cell identifier, a carrier identifier, a band identifier, a modulation and coding scheme MCS, a code rate, a precoding mode, an allowed synchronization source identifier, a priority configuration, power, or synchronization signal block information.

Further, the obtaining module is specifically configured to execute at least one of the following:
obtaining the first resource pool configured by the network side device;
or obtaining the first resource pool configured by the another terminal.

Further, at least two of the predefined first resource pool, the first resource pool configured by the network side device, the first resource pool configured by the another terminal, and the preconfigured first resource pool are compatible, and being compatible includes at least one of the following:
frequency domain resources are same, time domain resources are same, a frequency domain resource range of one is included in a frequency domain resource range of the other, or a time domain resource range of one is included in a time domain resource range of the other.

Further, the first resource pool includes at least one resource pool entity, and the terminal further includes:
a determining module, configured to determine at least one resource pool entity used in the first resource pool.

Further, the determining module is specifically configured to determine at least one resource pool entity used in the first resource pool in at least one of the following manners:
selecting a resource pool entity for monitoring from the first resource pool based on at least one of a predefined evaluation criteria, a preconfigured evaluation criteria, or a configured evaluation criteria; or
selecting a resource pool entity for monitoring from the first resource pool based on indication information sent by the network side device and/or another terminal.

Further, the evaluation criterion includes at least one of the following:
a measurement result, a priority of the resource pool entity, a service type supported by the resource pool entity, a transmission type supported by the resource pool entity, a load state of the resource pool entity, an SCS of the resource pool entity, a CP of the resource pool entity, a communication range of the resource pool entity, a power limit of the resource pool entity, or a service quality QoS requirement of the resource pool entity.

Further, a form of the indication information includes at least one of the following:
a bitmap;
an absolute identifier of the resource pool entity; or
a relative identifier of a resource pool entity relative to a total number of resource pool entities in the first resource pool.

Further, when the first resource pool is configured by another terminal, configuration information of the first resource pool is carried by a sidelink primary information block and/or another broadcast message sent by the another terminal on a sidelink.

Further, the first resource pool cannot be reconfigured.

Further, the obtaining module is further configured to obtain a reconfigured first resource pool, where the reconfigured first resource pool is the same as or compatible with at least one of the following: the predefined first resource pool, the preconfigured first resource pool, and the configured first resource pool.

Further, an identifier of the first resource pool is predefined in a protocol and/or configured by the network side device and/or configured and/or preconfigured by another terminal.

Further, the identifier of the first resource pool is a maximum value N or a minimum value N of allowed resource pool identifiers, where N is greater than or same to 1.

Further, the obtaining module is further configured to obtain configuration information of at least one second resource pool that is configured by a received resource pool configuration and/or predefined and/or preconfigured, and use the at least one second resource pool as a resource pool that is used subsequently; or
obtain configuration information of at least one second resource pool that is configured by a received resource pool configuration and/or predefined and/or preconfigured, selecting at least one second resource pool from the at least one second resource pool as a resource pool that is used subsequently, and sending an identifier of the selected resource pool to the resource pool configuration device.

The resource pool configuration device is a network side device or another terminal, and/or represents at least one of connected objects.

Further, a granularity of a time domain and/or frequency domain resource of the first resource pool is a multiple of a total beam number, or a granularity of a time domain and/or frequency domain resource of the first resource pool is a multiple of a total synchronization signal block number.

An embodiment of the present disclosure further provides a resource pool configuration device. As shown in FIG. 5, the resource pool configuration device includes:
a configuration module 41, configured to configure a first resource pool of a terminal.

In the embodiments, the first resource pool of the terminal is predefined and/or preconfigured and/or configured, mutual interference between different terminals with different configurations can be avoided.

Further, the first resource pool includes at least one of the following:
a time domain resource, a frequency domain resource, a subcarrier spacing SCS, a cyclic prefix CP, a bandwidth part BWP identifier, a cell identifier, a carrier identifier, a band identifier, a modulation and coding scheme MCS, a code rate, a precoding mode, an allowed synchronization source identifier, a priority configuration, power, or synchronization signal block information.

Further, the resource pool configuration device includes at least one of a network side device or another terminal.

Further, the first resource pool includes at least one resource pool entity, and the configuration module is further configured to configure a resource pool entity used by the terminal in the first resource pool.

Further, the configuration module is specifically configured to configure the resource pool entity used by the terminal in the first resource pool in at least one of the following manners:

configuring an evaluation criterion for selecting the resource pool entity; and sending indication information to the terminal, where the indication information instructs to select the resource pool entity from the first resource pool.

Further, the evaluation criterion includes at least one of the following:

a measurement result, a priority of the resource pool entity, a service type supported by the resource pool entity, a transmission type supported by the resource pool entity, a load state of the resource pool entity, an SCS of the resource pool entity, a CP of the resource pool entity, a communication range of the resource pool entity, a power limit of the resource pool entity, or a service quality QoS requirement of the resource pool entity.

Further, a form of the indication information includes at least one of the following:

a bitmap;

an absolute identifier of the resource pool entity; or a relative identifier of a resource pool entity relative to a total number of resource pool entities in the first resource pool.

Further, when the resource pool configuration device is another terminal, configuration information of the first resource pool is carried by a sidelink primary information block and/or another broadcast message sent by the another terminal on a sidelink.

Further, the first resource pool cannot be reconfigured.

Further, the resource pool configuration device further includes:

a reconfiguration module, configured to reconfigure the first resource pool of the terminal, where the reconfigured first resource pool and the configured first resource pool are the same or compatible.

Further, at least two of the predefined first resource pool, the first resource pool configured by the network side device, the first resource pool configured by the another terminal, or the preconfigured first resource pool are compatible, and being compatible includes at least one of the following:

frequency domain resources are same, time domain resources are same, a frequency domain resource range of one is included in a frequency domain resource range of the other, or a time domain resource range of one is included in a time domain resource range of the other.

Further, an identifier of the first resource pool is predefined in a protocol and/or configured by the network side device and/or configured and/or preconfigured by another terminal.

Further, the identifier of the first resource pool is a maximum value N or a minimum value N of allowed resource pool identifiers, where N is greater than or same to 1.

Further, the resource pool configuration device further includes:

a sending module, configured to send configuration information of at least one second resource pool to the terminal; or send configuration information of at least one second resource pool to the terminal, and receive an identifier of selected at least one second resource pool that is returned by the terminal.

Further, a granularity of a time domain and/or frequency domain resource of the first resource pool is a multiple of a total beam number, or a granularity of a time domain and/or frequency domain resource of the first resource pool is a multiple of a total synchronization signal block number.

An embodiment of the present disclosure further provides a resource pool configuration device, and can implement details of the resource pool configuration method in the above embodiments and achieve the same effect. The resource pool configuration device may be a network side device or a terminal.

Figure 6:
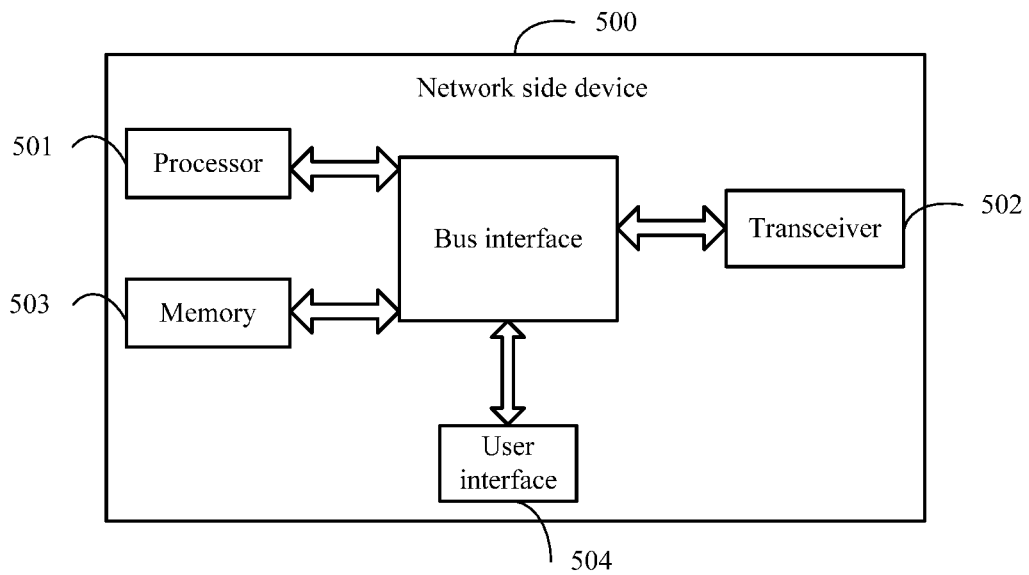
FIG. 6 is a schematic diagram of composition of a network side device according to an embodiment of the present disclosure.

When the resource pool configuration device is a network side device, as shown in FIG. 6, the network side device 500 includes: a processor 501, a transceiver 502, a memory 503, a user interface 504, and a bus interface.

In this embodiment of the present disclosure, the network side device 500 further includes: a computer program stored in the memory 503 and capable of running on the processor 501. When the computer program is executed by the processor 501, the following step is implemented: configuring a first resource pool of a terminal.

In FIG. 6, a bus architecture may include any quantity of interconnected buses and bridges, which are specifically connected together by various circuits of one or more processors represented by the processor 501 and a memory represented by the memory 503. The bus architecture may further link various other circuits such as a peripheral device, a voltage regulator, and a power management circuit together. These are all well-known in the art, and therefore are not further described in this specification. The bus interface provides an interface. The transceiver 502 may be a plurality of elements, in other words, includes a transmitter and a receiver, and provides a unit configured to communicate with various other apparatuses on a transmission medium. For different user equipment, the user interface 504 may alternatively be an interface for externally and internally connecting required equipment. The connected equipment includes but is not limited to a keypad, a display, a speaker, a microphone, a joystick, and the like.

The processor 501 is responsible for management on and general processing of the bus architecture. The memory 503 can store data used by the processor 501 during operation execution.

Further, the first resource pool includes at least one of the following:

a time domain resource, a frequency domain resource, a subcarrier spacing SCS, a cyclic prefix CP, a bandwidth part BWP identifier, a cell identifier, a carrier identifier, a band identifier, a modulation and coding scheme MCS, a code rate, a precoding mode, an allowed synchronization source identifier, a priority configuration, power, or synchronization signal block information.

Further, the resource pool configuration device includes at least one of a network side device or another terminal.

Further, the first resource pool includes at least one resource pool entity, and when the computer program is executed by the processor 501, the following step is further performed:

configuring a resource pool entity used by the terminal in the first resource pool.

Further, when the computer program is executed by the processor 501, the following steps are further performed:

configuring an evaluation criterion for selecting the resource pool entity; and sending indication information to the terminal, where the indication information instructs to select the resource pool entity from the first resource pool.

Further, the evaluation criterion includes at least one of the following:

a measurement result, a priority of the resource pool entity, a service type supported by the resource pool entity, a transmission type supported by the resource pool entity, a load state of the resource pool entity, an SCS of the resource pool entity, a cyclic prefix CP of the resource pool entity, a communication range of the resource pool entity, a power limit of the resource pool entity, or a service quality QoS requirement of the resource pool entity.

Further, a form of the indication information includes at least one of the following:

a bitmap;

an absolute identifier of the resource pool entity; or a relative identifier of a resource pool entity relative to a total number of resource pool entities in the first resource pool.

Further, when the resource pool configuration device is another terminal, configuration information of the first resource pool is carried by a sidelink primary information block and/or another broadcast message sent by the another terminal on a sidelink.

Further, the first resource pool cannot be reconfigured.

Further, when the computer program is executed by the processor 501, the following step is further performed:

reconfiguring the first resource pool of the terminal, where the reconfigured first resource pool and the configured first resource pool are the same or compatible.

Further, at least two of the predefined first resource pool, the first resource pool configured by the network side device, the first resource pool configured by the another terminal, or the preconfigured first resource pool are compatible, and being compatible includes at least one of the following:

frequency domain resources are same, time domain resources are same, a frequency domain resource range of one is included in a frequency domain resource range of the other, or a time domain resource range of one is included in a time domain resource range of the other.

Further, an identifier of the first resource pool is predefined in a protocol and/or configured by the network side device and/or configured and/or preconfigured by another terminal.

Further, the identifier of the first resource pool is a maximum value N or a minimum value N of allowed resource pool identifiers, where N is greater than or same to 1.

Further, when the computer program is executed by the processor 501, the following steps are further performed:

sending configuration information of at least one second resource pool to the terminal; or sending configuration information of at least one second resource pool to the terminal, and receiving an identifier of selected at least one second resource pool that is returned by the terminal.

Further, a granularity of a time domain and/or frequency domain resource of the first resource pool is a multiple of a total beam number, or a granularity of a time domain and/or frequency domain resource of the first resource pool is a multiple of a total synchronization signal block number.

Figure 7:
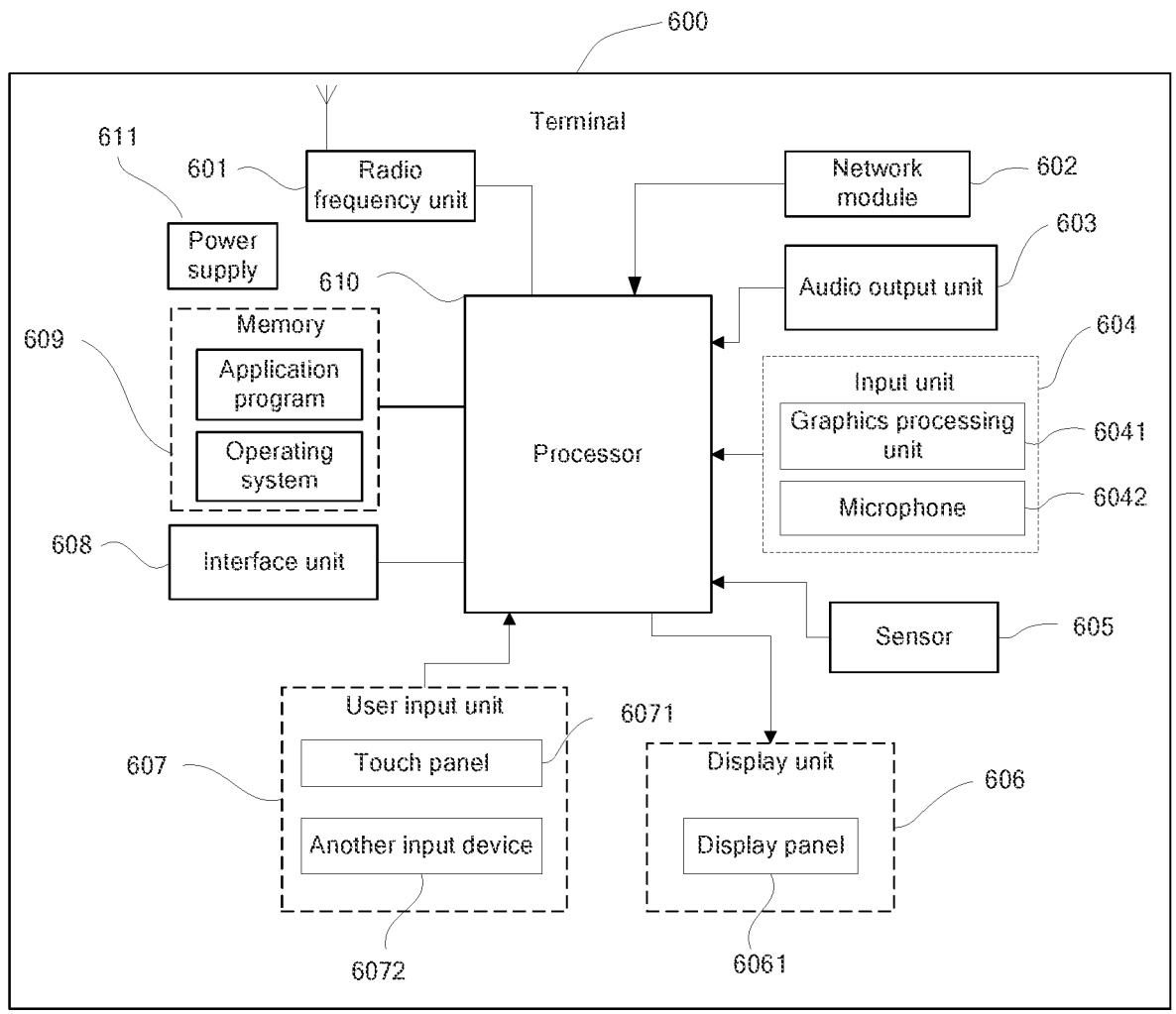
FIG. 7 is a schematic composition diagram of a terminal according to an embodiment of the present disclosure.

When the resource pool configuration device is a terminal, as shown in FIG. 7, the terminal 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and the like. Those skilled in the art may understand that the terminal structure shown in FIG. 7 does not constitute a limitation on the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The processor 610 is configured to configure a first resource pool of a terminal.

Further, the first resource pool includes at least one of the following:

a time domain resource, a frequency domain resource, a subcarrier spacing SCS, a cyclic prefix CP, a bandwidth part BWP identifier, a cell identifier, a carrier identifier, a band identifier, a modulation and coding scheme MCS, a code rate, a precoding mode, an allowed synchronization source identifier, a priority configuration, power, or synchronization signal block information.

Further, the resource pool configuration device includes at least one of a network side device or another terminal.

Further, the first resource pool includes at least one resource pool entity, and when the computer program is executed by the processor 610, the following step is further performed:

configuring a resource pool entity used by the terminal in the first resource pool.

Further, when the computer program is executed by the processor 610, the following steps are further performed:

configuring an evaluation criterion for selecting the resource pool entity; and sending indication information to the terminal, where the indication information instructs to select the resource pool entity from the first resource pool.

Further, the evaluation criterion includes at least one of the following:

a measurement result, a priority of the resource pool entity, a service type supported by the resource pool entity, a transmission type supported by the resource pool entity, a load state of the resource pool entity, an SCS of the resource pool entity, a CP of the resource pool entity, a communication range of the resource pool entity, a power limit of the resource pool entity, or a service quality QoS requirement of the resource pool entity.

Further, a form of the indication information includes at least one of the following:
a bitmap;
an absolute identifier of the resource pool entity; or
a relative identifier of a resource pool entity relative to a total number of resource pool entities in the first resource pool.

Further, when the resource pool configuration device is another terminal, configuration information of the first resource pool is carried by a sidelink primary information block and/or another broadcast message sent by the another terminal on a sidelink.

Further, the first resource pool cannot be reconfigured.

Further, when the computer program is executed by the processor 610, the following step is further performed:
reconfiguring the first resource pool of the terminal, where the reconfigured first resource pool and the configured first resource pool are the same or compatible.

Further, at least two of the predefined first resource pool, the first resource pool configured by the network side device, the first resource pool configured by the another terminal, or the preconfigured first resource pool are compatible, and being compatible includes at least one of the following:
frequency domain resources are same, time domain resources are same, a frequency domain resource range of one is included in a frequency domain resource range of the other, or a time domain resource range of one is included in a time domain resource range of the other.

Further, an identifier of the first resource pool is predefined in a protocol and/or configured by the network side device and/or configured and/or preconfigured by another terminal.

Further, the identifier of the first resource pool is a maximum value N or a minimum value N of allowed resource pool identifiers, where N is greater than or same to 1.

Further, when the computer program is executed by the processor 610, the following steps are further performed:
sending configuration information of at least one second resource pool to the terminal; or
sending configuration information of at least one second resource pool to the terminal, and receiving an identifier of selected at least one second resource pool that is returned by the terminal.

Further, a granularity of a time domain and/or frequency domain resource of the first resource pool is a multiple of a total beam number, or a granularity of a time domain and/or frequency domain resource of the first resource pool is a multiple of a total synchronization signal block number.

It should be understood that, in this embodiment of the present disclosure, the radio frequency unit 601 may be configured to receive and transmit information, or receive and transmit signals during a call. Specifically, the radio frequency unit 601 receives downlink data from a base station, and transmits the downlink data to the processor 610 for processing; and in addition, transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 can also communicate with another device through a wireless communications system and network.

The terminal provides a user with wireless broadband Internet access through the network module 602, for example, helps the user send and receive emails, browse web pages, and access streaming media.

The audio output unit 603 can convert audio data received by the radio frequency unit 601 or the network module 602 or stored in the memory 609 into an audio signal, and output the audio signal into sound. In addition, the audio output unit 603 can also provide audio output related to a specific function performed by the terminal 600 (for example, call signal receiving sound or message receiving sound). The audio output unit 603 includes a speaker, a buzzer, a telephone receiver, and the like.

The input unit 604 is configured to receive audio or video signals. The input unit 604 may include a graphics processing unit (GPU) 6041 and a microphone 6042. The graphics processing unit 6041 processes image data of a static picture or a video obtained by an image capturing apparatus (for example, a camera) in a video capturing mode or an image capturing mode. A processed image frame can be displayed on the display unit 606. The image frame processed by the graphics processing unit 6041 can be stored in the memory 609 (or another storage medium) or sent via the radio frequency unit 601 or the network module 602. The microphone 6042 can receive sound and can process such sound into audio data. Processed audio data can be converted, in telephone call mode, into a format that can be sent to a mobile communication base station via the radio frequency unit 601 for output.

The terminal 600 further includes at least one sensor 605, such as a light sensor, a motion sensor, and other sensors. Specifically, the light sensor includes an ambient light sensor and a proximity sensor, where the ambient light sensor can adjust brightness of the display panel 6061 based on brightness of ambient light, and the proximity sensor can turn off the display panel 6061 and/or backlight when the terminal 600 moves towards the ear. As a motion sensor, an accelerometer sensor can detect magnitude of acceleration in various directions (usually three axes), can detect magnitude and the direction of gravity when stationary, can be configured to identify terminal postures (such as switching between a landscape mode and a portrait mode, related games, and magnetometer posture calibration), can perform functions related to vibration identification (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information entered by a user or information provided for the user. The display unit 606 may include the display panel 6061, and the display panel 6061 may be configured in a form of a liquid crystal display (LCD), an organic light-emitting diode (OLED), or the like.

The user input unit 607 can be configured to receive input numeric or character information, and generate key signal inputs related to user settings and function control of the terminal. Specifically, the user input unit 607 includes a touch panel 6071 and other input devices 6072. The touch panel 6071, also called a touch screen, can collect a touch operation of the user on or near the touch panel 6071 (For example, the user uses any suitable object or accessory such as a finger or a stylus to operate on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 610, and receives and executes a command sent by the processor 610. In addition, the touch panel 6071 may be implemented by using a plurality of types such as a resistive type, a capacitive type, an infrared ray, and a surface acoustic wave. In addition to the touch panel 6071, the user input unit 607 may further include the other input devices 6072. Specifically, the other input devices 6072 may include but are not limited to a physical keyboard, function keys (such as a volume control key and a switch key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. Although in FIG. 7, the touch panel 6071 and the display panel 6061 are configured as two independent components to implement input and output functions of the terminal, in some embodiments, the touch panel 6071 and the display panel 6061 can be integrated to implement the input and output functions of the terminal. Details are not limited herein.

The interface unit 608 is an interface for connecting an external apparatus to the terminal 600. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 608 may be configured to receive an input (for example, data information or power) from an external apparatus and transmit the received input to one or more elements in the terminal 600, or transmit data between the terminal 600 and the external apparatus.

The memory 609 may be configured to store software programs and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on the use of the mobile phone, and the like. In addition, the memory 609 may include a high-speed random access memory or a nonvolatile memory, for example, at least one disk storage device, a flash memory, or another volatile solid-state storage device.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Optionally, the processor 610 may integrate an application processor and a modem processor. The application processor mainly deals with an operating system, a user interface, an application program, and the like. The modem processor mainly deals with wireless communication. It may be understood that the foregoing modem processor may not be integrated into the processor 610.

The terminal 600 may further include the power supply 611 (for example, a battery) configured to supply power to various components. Optionally, the power supply 611 may be logically connected to the processor 610 through a power management system, so as to implement functions such as managing charging, discharging, and power consumption through the power management system.

In addition, the terminal 600 includes some function modules that are not shown. Details are not described herein.

An embodiment of the present disclosure further provides a terminal, and the terminal can implement details of the resource pool obtaining method in the foregoing embodiments and achieve the same effect.

As shown in FIG. 7, the terminal 600 includes but is not limited to: a radio frequency unit 601, a network module 602, an audio output unit 603, an input unit 604, a sensor 605, a display unit 606, a user input unit 607, an interface unit 608, a memory 609, a processor 610, a power supply 611, and the like. Those skilled in the art may understand that the terminal structure shown in FIG. 7 does not constitute a limitation on the terminal. The terminal may include more or fewer components than those shown in the figure, or some components may be combined, or there may be a different component arrangement. In the embodiments of the present disclosure, the terminal includes, but is not limited to, a mobile phone, a tablet computer, a notebook computer, a palmtop computer, a vehicle-mounted terminal, a wearable device, a pedometer, or the like.

The processor 610 is configured to obtain a first resource pool in at least one of the following manners: obtaining the predefined first resource pool; obtaining the preconfigured first resource pool; or obtaining the configured first resource pool.

Further, the processor 610 is further configured to monitor the first resource pool according to a monitoring procedure.

Further, the monitoring the first resource pool according to a monitoring procedure includes at least one of the following:

monitoring the first resource pool in a first time window for F times, where F is a positive integer;

monitoring the first resource pool in a first time window for a maximum of F times;

monitoring the first resource pool in a first time window for a minimum of F times;

monitoring the first resource pool according to a first periodicity;

monitoring the first resource pool when a corresponding transmission configuration or a corresponding transmission mode is used; or monitoring the first resource pool when transmission of another resource pool meets a corresponding condition.

Further, the corresponding transmission configuration or the corresponding transmission mode includes at least one of the following:

when broadcasting is needed;
when beam sweeping is needed;
when connection fails;
when a resource pool is reconfigured;
when a resource pool is added;
when a resource pool is released;
when quasi-co-location QCL information cannot be obtained; or
when a synchronization source that meets a requirement cannot be found.

Further, the corresponding condition includes at least one of the following:
  a bit error rate is higher than a threshold;
  a block error rate is higher than a threshold;
  a false alarm rate exceeds a threshold;
  beam failure recovery;
  connection failure recovery; or
  connection re-establishment.

Further, the monitoring the first resource pool includes at least one of the following:
  performing synchronization in the first resource pool;
  performing measurement in the first resource pool;
  performing transmission in the first resource pool; or
  performing sensing in the first resource pool.

Further, a measurement measured by the terminal in the first resource pool includes at least one of the following:
  reference signal received power RSRP,
  reference signal received quality RSRQ, or
  received signal strength indicator RSSI.

Further, content transmitted in the first resource pool includes at least one of the following:
  a broadcast message, a synchronization signal, a public security service, a basic V2X service, a periodic service, configuration information of another resource pool, a correspondence between a service and a resource pool, a correspondence between a transmission type and a resource pool, a discovery message, configuration information of an extra resource pool, or radio resource control information.

Further, when the content transmitted in the first resource pool includes the configuration information of the another resource pool, the configuration information of the another resource pool is carried in at least one of the following: a first information block, a connection request, and a message of a subsequent step.

Further, the first resource pool includes at least one of the following:
  a time domain resource, a frequency domain resource, a subcarrier spacing SCS, a cyclic prefix CP, a bandwidth part BWP identifier, a cell identifier, a carrier identifier, a band identifier, a modulation and coding scheme MCS, a code rate, a precoding mode, an allowed synchronization source identifier, a priority configuration, power, or synchronization signal block information.

Further, the obtaining a first resource pool in at least one of the following manners: obtaining the predefined first resource pool; obtaining the preconfigured first resource pool; and obtaining the configured first resource pool includes at least one of the following:
  obtaining the first resource pool configured by the network side device;
  or obtaining the first resource pool configured by the another terminal.

Further, at least two of the predefined first resource pool, the first resource pool configured by the network side device, the first resource pool configured by the another terminal, or the preconfigured first resource pool are compatible, and being compatible includes at least one of the following:
  frequency domain resources are same, time domain resources are same, a frequency domain resource range of one is included in a frequency domain resource range of the other, or a time domain resource range of one is included in a time domain resource range of the other.

Further, the first resource pool includes at least one resource pool entity, and the processor 610 is further configured to determine at least one resource pool entity used in the first resource pool.

Further, at least one resource pool entity used in the first resource pool is determined in at least one of the following manners:
  selecting a resource pool entity for monitoring from the first resource pool based on at least one of a predefined evaluation criteria, a preconfigured evaluation criteria, or a configured evaluation criteria; or
  selecting a resource pool entity for monitoring from the first resource pool based on indication information sent by the network side device and/or another terminal.

Further, the evaluation criterion includes at least one of the following:
  a measurement result, a priority of the resource pool entity, a service type supported by the resource pool entity, a transmission type supported by the resource pool entity, a load state of the resource pool entity, an SCS of the resource pool entity, a CP of the resource pool entity, a communication range of the resource pool entity, a power limit of the resource pool entity, or a service quality QoS requirement of the resource pool entity.

Further, a form of the indication information includes at least one of the following:
  a bitmap;
  an absolute identifier of the resource pool entity; and
  a relative identifier of a resource pool entity relative to a total number of resource pool entities in the first resource pool.

Further, when the first resource pool is configured by another terminal, configuration information of the first resource pool is carried by a sidelink primary information block and/or another broadcast message sent by the another terminal on a sidelink.

Further, the first resource pool cannot be reconfigured.

Further, the processor 610 is further configured to obtain a reconfigured first resource pool, where the reconfigured first resource pool is the same as or compatible with at least one of the following: the predefined first resource pool, the preconfigured first resource pool, or the configured first resource pool.

Further, an identifier of the first resource pool is predefined in a protocol and/or configured by the network side device and/or configured and/or preconfigured by another terminal.

Further, the identifier of the first resource pool is a maximum value N or a minimum value N of allowed resource pool identifiers, where N is greater than or same to 1.

Further, the processor 610 is further configured to obtain configuration information of at least one second resource pool that is configured by a received resource pool configuration and/or predefined and/or preconfigured, and use the at least one second resource pool as a resource pool that is used subsequently; or
  obtain configuration information of at least one second resource pool that is configured by a received resource pool configuration and/or predefined and/or preconfigured, select at least one second resource pool from the at least one second resource pool as a resource pool that is used subsequently, and send an identifier of the selected resource pool to the resource pool configuration device.

The resource pool configuration device is a network side device or another terminal, and/or represents at least one of connected objects.

Further, a granularity of a time domain and/or frequency domain resource of the first resource pool is a multiple of a total beam number, or a granularity of a time domain and/or frequency domain resource of the first resource pool is a multiple of a total synchronization signal block number.

It should be understood that, in this embodiment of the present disclosure, the radio frequency unit 601 may be configured to receive and transmit information, or receive and transmit signals during a call. Specifically, the radio frequency unit 601 receives downlink data from a base station, and transmits the downlink data to the processor 610 for processing; and in addition, transmits uplink data to the base station. Generally, the radio frequency unit 601 includes but is not limited to an antenna, at least one amplifier, a transceiver, a coupler, a low noise amplifier, a duplexer, and the like. In addition, the radio frequency unit 601 can also communicate with another device through a wireless communications system and network.

The terminal provides a user with wireless broadband Internet access through the network module 602, for example, helps the user send and receive emails, browse web pages, and access streaming media.

The audio output unit 603 can convert audio data received by the radio frequency unit 601 or the network module 602 or stored in the memory 609 into an audio signal, and output the audio signal into sound. In addition, the audio output unit 603 can also provide audio output related to a specific function performed by the terminal 600 (for example, call signal receiving sound or message receiving sound). The audio output unit 603 includes a speaker, a buzzer, a telephone receiver, and the like.

The input unit 604 is configured to receive audio or video signals. The input unit 604 may include a graphics processing unit (GPU) 6041 and a microphone 6042. The graphics processing unit 6041 processes image data of a static picture or a video obtained by an image capturing apparatus (for example, a camera) in a video capturing mode or an image capturing mode. A processed image frame can be displayed on the display unit 606. The image frames processed by the graphics processing unit 6041 can be stored in the memory 609 (or another storage medium) or sent by the radio frequency unit 601 or the network module 602. The microphone 6042 can receive sounds, and can process such sounds into audio frequency data. The audio data obtained through processing may be converted, in a telephone call mode, into a format that can be sent to a mobile communications base station via the radio frequency unit 601 for output.

The terminal 600 further includes at least one sensor 605, such as a light sensor, a motion sensor, and other sensors. Specifically, the light sensor includes an ambient light sensor and a proximity sensor, where the ambient light sensor can adjust brightness of the display panel 6061 based on brightness of ambient light, and the proximity sensor can turn off the display panel 6061 and/or backlight when the terminal 600 moves towards the ear. As a motion sensor, an accelerometer sensor can detect magnitude of acceleration in various directions (usually three axes), can detect magnitude and the direction of gravity when stationary, can be configured to identify terminal postures (such as switching between a landscape mode and a portrait mode, related games, and magnetometer posture calibration), can perform functions related to vibration identification (such as a pedometer and a knock), and the like. The sensor 605 may further include a fingerprint sensor, a pressure sensor, an iris sensor, a molecular sensor, a gyroscope, a barometer, a hygrometer, a thermometer, an infrared sensor, or the like. Details are not described herein.

The display unit 606 is configured to display information entered by a user or information provided for the user. The display unit 606 may include the display panel 6061, and the display panel 6061 may be configured in a form of a liquid crystal display (LCD), an organic light-emitting diode (OLED), or the like.

The user input unit 607 can be configured to receive input numeric or character information, and generate key signal inputs related to user settings and function control of the terminal. Specifically, the user input unit 607 includes a touch panel 6071 and other input devices 6072. The touch panel 6071, also called a touch screen, can collect a touch operation of the user on or near the touch panel 6071 (For example, the user uses any suitable object or accessory such as a finger or a stylus to operate on or near the touch panel 6071). The touch panel 6071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 610, and receives and executes a command sent by the processor 610. In addition, the touch panel 6071 may be implemented by using a plurality of types such as a resistive type, a capacitive type, an infrared ray, and a surface acoustic wave. In addition to the touch panel 6071, the user input unit 607 may further include the other input devices 6072. Specifically, the other input devices 6072 may include but is not limited to a physical keyboard, function keys (such as a volume control key and a switch key), a trackball, a mouse, and a joystick. Details are not described herein.

Further, the touch panel 6071 may cover the display panel 6061. When detecting a touch operation on or near the touch panel 6071, the touch panel 6071 transmits the touch operation to the processor 610 to determine a type of a touch event. Then the processor 610 provides corresponding visual output on the display panel 6061 based on the type of the touch event. Although in FIG. 7, the touch panel 6071 and the display panel 6061 are configured as two independent components to implement input and output functions of the terminal, in some embodiments, the touch panel 6071 and the display panel 6061 can be integrated to implement the input and output functions of the terminal. Details are not limited herein.

The interface unit 608 is an interface for connecting an external apparatus to the terminal 600. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 608 may be configured to receive an input (for example, data information or power) from an external apparatus and transmit the received input to one or more elements in the terminal 600, or transmit data between the terminal 600 and the external apparatus.

The memory 609 may be configured to store software programs and various data. The memory 609 may mainly include a program storage area and a data storage area. The program storage area may store an operating system, an application program required by at least one function (such as a sound playback function and an image playback function), and the like. The data storage area may store data (such as audio data and a phone book) created based on the use of the mobile phone, and the like. In addition, the memory 609 may include a high-speed random access memory or a nonvolatile memory, for example, at least one disk storage device, a flash memory, or another volatile solid-state storage device.

The processor 610 is a control center of the terminal, connects various parts of the entire terminal by using various interfaces and circuits, and performs various functions of the terminal and processes data by running or executing software programs and/or modules stored in the memory 609 and invoking data stored in the memory 609, so as to monitor the terminal as a whole. The processor 610 may include one or more processing units. Optionally, the processor 610 may integrate an application processor with a modem processor. The application processor mainly processes the operating system, a user interface, the application program, and the like, and the modem processor mainly processes wireless communication. It may be understood that the foregoing modem processor may not be integrated into the processor 610.

The terminal 600 may further include a power supply 611 (for example, a battery) that supplies power to various components. Optionally, the power supply 611 may be logically connected to the processor 610 through a power supply management system, to perform functions of managing charging, discharging, and power consumption through the power supply management system.

In addition, the terminal 600 includes some function modules not shown, and details are not described herein.

An embodiment of the present disclosure further provides a computer readable storage medium. The computer readable storage medium stores a computer program. When executed by the processor, the program implements the steps of the foregoing resource pool configuration device or the steps of the foregoing resource pool obtaining device.

It can be understood that those embodiments described herein can be implemented with hardware, software, firmware, middleware, microcode or their combinations. For implementation with hardware, the processing unit can be implemented in one or more application specific integrated circuits (ASIC), a digital signal processor (DSP), a digital signal processing device (DSP Device, DSPD), a programmable logic device (PLD), a field-programmable gate array (PFGA), general processors, controllers, micro-controllers, microprocessors, and another electronic unit for implementing the functions of the present application, or their combinations.

For implementation with software, the technology described herein can be implemented by executing modules for functions described herein (for example, process and function). Software codes can be stored in the memory and executed by the processor. The memory can be implemented inside or outside the processor.

The embodiments in this specification are described in a progressive manner. Each embodiment focuses on a difference from another embodiment. For a same or similar part of the embodiments, refer to each other.

Those skilled in the art shall understand that the embodiments of the present disclosure can be provided as methods, apparatuses or computer program products. Therefore, the embodiments of the present disclosure may take the form of a hardware only embodiment, a software only embodiment, or an embodiment with both software and hardware. Moreover, the embodiments of the present disclosure may use a form of a computer program product that is implemented on one or more computer-usable storage media (including but not limited to a magnetic disk memory, a CD-ROM, an optical memory, and the like) that include computer-usable program code.

The embodiments of the present disclosure are described with reference to the flowcharts and/or block diagrams of the methods, user equipment (system), and computer program products thereof. It should be understood that computer program commands can be used to implement each of the procedures and/or blocks in the flowcharts and/or block diagrams, and combinations of procedures and/or blocks in the flowcharts and/or block diagrams. Those computer program commands can be provided in a general computer, a special computer, an embedded processor, or another processor of programmable user equipment for data processing to generate a machine, so that the commands, executed by the computer or the another processor of programmable user equipment for data processing, generate an apparatus for implementing one or more procedures of the flowchart and/or conducting specific functions designed by one or more blocks of the block diagram.

Those computer program commands can further be stored in a computer readable memory, which can guide the computer or another programmable user equipment for data processing to work in a specific way, so that the commands stored in the computer readable memory generate a manufactured product including a command apparatus. The command apparatus implements functions in the flowchart and/or one or more blocks in the block diagram.

Those computer program commands can further be loaded in a computer or another programmable user equipment for data processing, so that a series of steps are executed in the computer or the programmable user equipment to generate processing for computer implementation. Thus, commands executed in the computer or another programmable user equipment provide steps for implementing one or more procedures of the flowchart and/or steps for conducting functions specified in one or more blocks of the block diagram.

Despite description of the preferred embodiments of the present disclosure, once those skilled in the art know basic creative concepts, they can make changes and modifications to those embodiments. Therefore, the appended claims are intended to be interpreted as including the preferred embodiments and all changes and modifications that fall within the scope of the embodiments of the present disclosure.

It should be noted that in this text the relational terms such as "first" and "second" are merely used to distinguish one object or operation from another object or operation, and not necessarily require or hint that those objects or operations have any such actual relationship or are in such actual sequence. Moreover, terms "including", "including", or any other variants are used to cover non-exclusive inclusion, so that processes, methods, articles or user equipment, each of which includes a series of factors, include not only those factors but also other unlisted factors, or further include other inherent factors of such processes, methods, articles or user equipment. Without more limitations, the factors defined by sentences "including one . . . " do not exclude that the processes, methods, articles or user equipment including the above-mentioned factors also incorporate other identical factors.

The foregoing descriptions are merely the optional implementations of the present disclosure. It should be noted that those of ordinary skill in the art may further make several improvements and refinements without departing from the principles described in the present disclosure, and these improvements and refinements also fall within the protection scope of the present disclosure.

The invention claimed is:

1. A resource pool obtaining method, comprising:
obtaining, by a terminal, a first resource pool in at least one of the following manners: obtaining a predefined first resource pool; obtaining a preconfigured first resource pool; or obtaining a configured first resource pool;
wherein a granularity of a time domain and/or frequency domain resource of the first resource pool is a multiple of a total beam number, or a granularity of a time domain and/or frequency domain resource of the first resource pool is a multiple of a total synchronization signal block number.

2. The resource pool obtaining method according to claim 1, wherein at least two of the predefined first resource pool, the preconfigured first resource pool, or the configured first resource pool are compatible, and being compatible comprises at least one of the following:
frequency domain resources are same, time domain resources are same, a frequency domain resource range of one is comprised in a frequency domain resource range of the other, and a time domain resource range of one is comprised in a time domain resource range of the other.

3. The resource pool obtaining method according to claim 1, further comprising:
obtaining a reconfigured first resource pool, wherein the reconfigured first resource pool is the same as or compatible with at least one of the following: the predefined first resource pool, the preconfigured first resource pool, or the configured first resource pool.

4. The resource pool obtaining method according to claim 1, further comprising:
monitoring the first resource pool according to a monitoring procedure.

5. The resource pool obtaining method according to claim 4, wherein the monitoring the first resource pool according to a monitoring procedure comprises at least one of the following:
monitoring the first resource pool in a first time window;
monitoring the first resource pool according to a first periodicity;
monitoring the first resource pool when a corresponding transmission configuration or a corresponding transmission mode is used; or
monitoring the first resource pool when transmission of another resource pool meets a corresponding condition.

6. The resource pool obtaining method according to claim 5, wherein the corresponding transmission configuration or the corresponding transmission mode comprises at least one of the following:
when broadcasting is needed;
when beam sweeping is needed;
when connection fails;
when a resource pool is reconfigured;
when a resource pool is added;
when a resource pool is released;
when quasi-co-location (QCL) information cannot be obtained; or
when a synchronization source that meets a requirement cannot be found.

7. The resource pool obtaining method according to claim 5, wherein the corresponding condition comprises at least one of the following:
a bit error rate is higher than a threshold;
a block error rate is higher than a threshold;
a false alarm rate exceeds a threshold;
beam failure recovery;
connection failure recovery; or
connection re-establishment.

8. The resource pool obtaining method according to claim 4, wherein the monitoring a first resource pool comprises at least one of the following:
performing synchronization in the first resource pool;
performing measurement in the first resource pool;
performing transmission in the first resource pool; or
sensing in the first resource pool.

9. A communications device, comprising: a memory, a processor, and a computer program that is stored in the memory and capable of running on the processor, wherein the computer program, when executed by the processor, causes the communications device to implement:
obtaining a first resource pool in at least one of the following manners: obtaining a predefined first resource pool; obtaining a preconfigured first resource pool; or obtaining a configured first resource pool;
wherein a granularity of a time domain and/or frequency domain resource of the first resource pool is a multiple of a total beam number, or a granularity of a time domain and/or frequency domain resource of the first resource pool is a multiple of a total synchronization signal block number.

10. The communications device according to claim 9, wherein at least two of the predefined first resource pool, the preconfigured first resource pool, or the configured first resource pool are compatible, and being compatible comprises at least one of the following:
frequency domain resources are same, time domain resources are same, a frequency domain resource range of one is comprised in a frequency domain resource range of the other, or a time domain resource range of one is comprised in a time domain resource range of the other.

11. The communications device according to claim 9, wherein the computer program, when executed by the processor, causes the communications device to further implement:
obtaining a reconfigured first resource pool, wherein the reconfigured first resource pool is the same as or compatible with at least one of the following: the predefined first resource pool, the preconfigured first resource pool, or the configured first resource pool.

12. The communications device according to claim 9, wherein the computer program, when executed by the processor, causes the communications device to further implement:
monitoring the first resource pool according to a monitoring procedure.

13. The communications device according to claim 12, wherein the monitoring the first resource pool according to a monitoring procedure comprises at least one of the following:
monitoring the first resource pool in a first time window;
monitoring the first resource pool according to a first periodicity;
monitoring the first resource pool when a corresponding transmission configuration or a corresponding transmission mode is used; or
monitoring the first resource pool when transmission of another resource pool meets a corresponding condition.

14. The communications device according to claim 13, wherein the corresponding transmission configuration or the corresponding transmission mode comprises at least one of the following:
- when broadcasting is needed;
- when beam sweeping is needed;
- when connection fails;
- when a resource pool is reconfigured;
- when a resource pool is added;
- when a resource pool is released;
- when quasi-co-location (QCL) information cannot be obtained; or
- when a synchronization source that meets a requirement cannot be found.

15. The communications device according to claim 13, wherein the corresponding condition comprises at least one of the following:
- a bit error rate is higher than a threshold;
- a block error rate is higher than a threshold;
- a false alarm rate exceeds a threshold;
- beam failure recovery;
- connection failure recovery; or
- connection re-establishment.

16. The communications device according to claim 12, wherein the monitoring a first resource pool comprises at least one of the following:
- performing synchronization in the first resource pool;
- performing measurement in the first resource pool;
- performing transmission in the first resource pool; or
- sensing in the first resource pool.

17. A communications device, comprising: a memory, a processor, and a computer program that is stored in the memory and capable of running on the processor, wherein the computer program, when executed by the processor, causes the communications device to implement:

configuring a first resource pool of a terminal;
wherein a granularity of a time domain and/or frequency domain resource of the first resource pool is a multiple of a total beam number, or a granularity of a time domain and/or frequency domain resource of the first resource pool is a multiple of a total synchronization signal block number.

18. The communications device according to claim 17, wherein at least two of a predefined first resource pool, a preconfigured first resource pool, or a configured first resource pool are compatible, and being compatible comprises at least one of the following:
- frequency domain resources are same, time domain resources are same, a frequency domain resource range of one is comprised in a frequency domain resource range of the other, or a time domain resource range of one is comprised in a time domain resource range of the other.

19. The communications device according to claim 17, wherein the computer program, when executed by the processor, causes the communications device to further implement:
reconfiguring the first resource pool of the terminal, wherein the reconfigured first resource pool and the configured first resource pool are the same or compatible.

20. A non-transitory computer-readable storage medium, wherein the non-transitory computer-readable storage medium stores a computer program, wherein the computer program, when executed by a processor, implements the steps of the resource pool obtaining method according to claim 1.

* * * * *